No. 881,230. PATENTED MAR. 10, 1908.
E. C. FILSTRUP.
SAW SHARPENING MACHINE.
APPLICATION FILED JAN. 10, 1907.

3 SHEETS—SHEET 1.

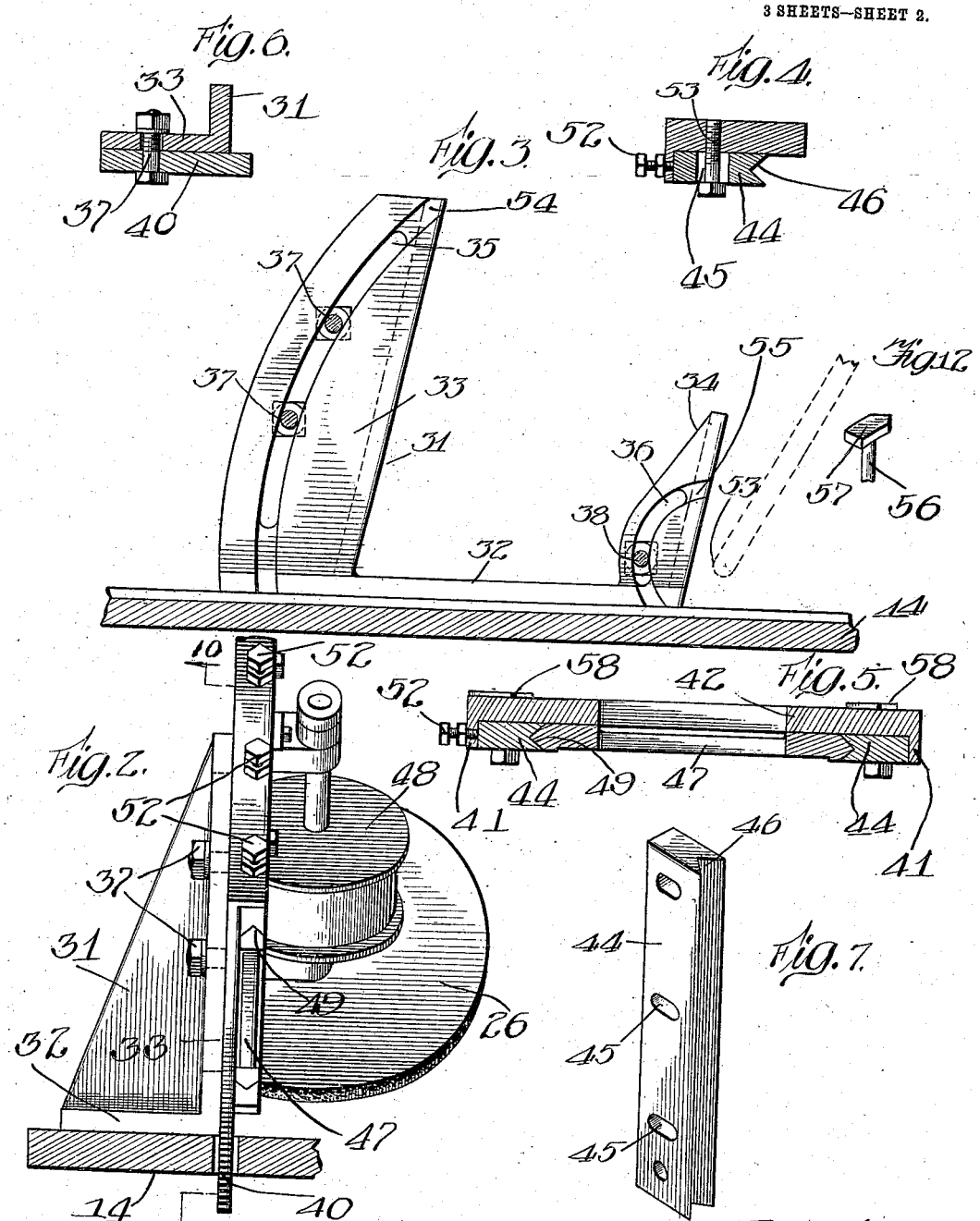

No. 881,230.

PATENTED MAR. 10, 1908.

E. C. FILSTRUP.
SAW SHARPENING MACHINE.
APPLICATION FILED JAN. 10, 1907.

3 SHEETS—SHEET 3.

Witnesses:
Ira D. Perry
G. V. Domarus.

Inventor:
Eddie C. Filstrup
By Buckley & Durand
Attys.

UNITED STATES PATENT OFFICE.

EDDIE C. FILSTRUP, OF CHICAGO, ILLINOIS, ASSIGNOR TO COVEL MANUFACTURING COMPANY, OF CHICAGO, ILLINOIS, A CORPORATION OF ILLINOIS.

SAW-SHARPENING MACHINE.

No. 881,230.      Specification of Letters Patent.      Patented March 10, 1908.

Application filed January 10, 1907. Serial No. 351,594.

*To all whom it may concern:*

Be it known that I, EDDIE C. FILSTRUP, a citizen of the United States of America, and resident of Chicago, Cook county, Illinois, have invented a certain new and useful Improvement in Saw-Sharpening Machines, of which the following is a specification.

My invention relates to improvements in saw sharpening machines, and is especially adapted for use in machines designed to automatically feed the saw in coöperation with grinding mechanism—that is, the establishment of a proper coöperation of parts whereby the saw is accurately and automatically ground.

The object of my invention is to provide means for accurately positioning the grinding wheel for operation on a saw tooth, and at the same time making it possible to quickly shift the position and angle of the wheel when it becomes necessary to do so in the course of the operation.

A further object is the production of a device by means of which the relative position of the various parts of the machine and tools under operation may be varied to accommodate different conditions.

A further object is to provide a device the parts of which may be readily assembled, and one that is least liable to become disarranged.

Figure 1:
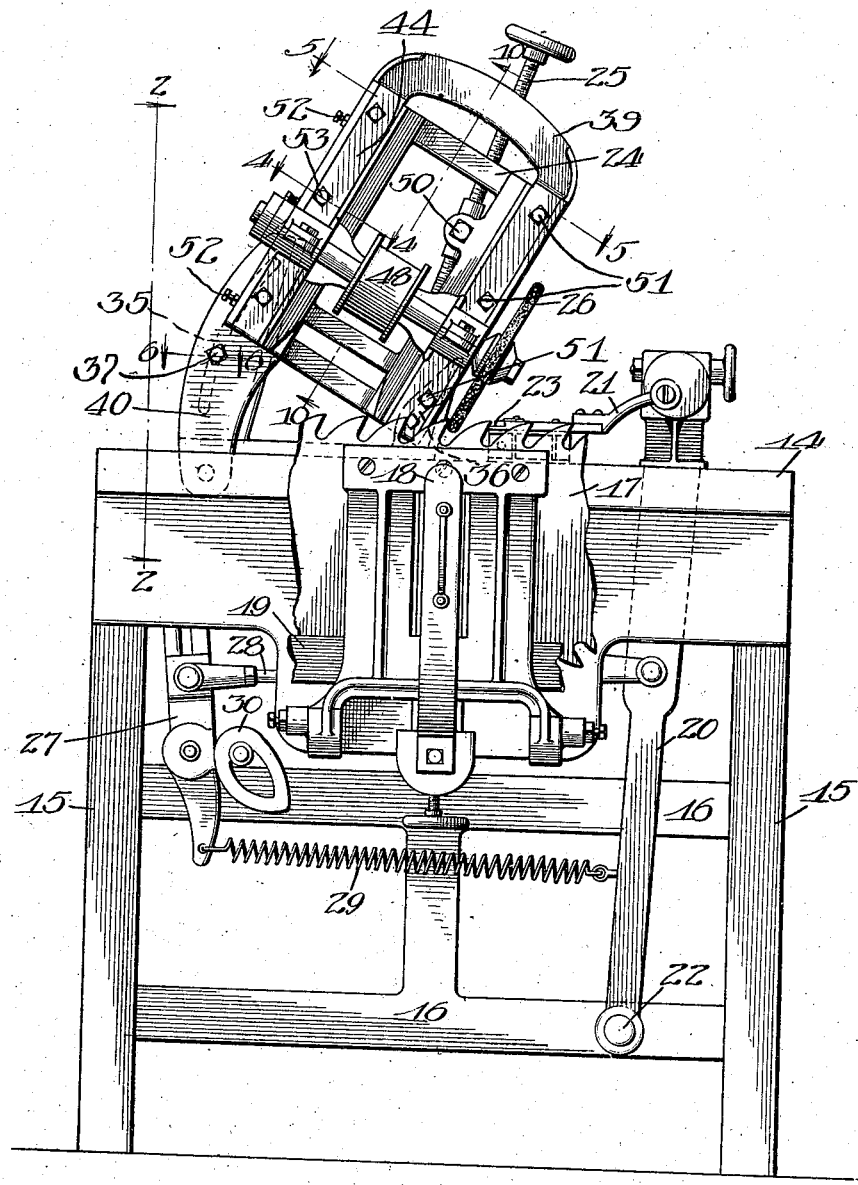
Figure 8:
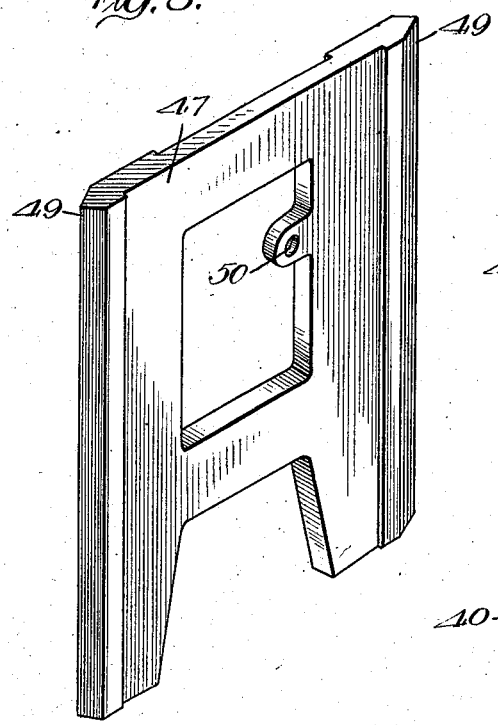
Figure 9:
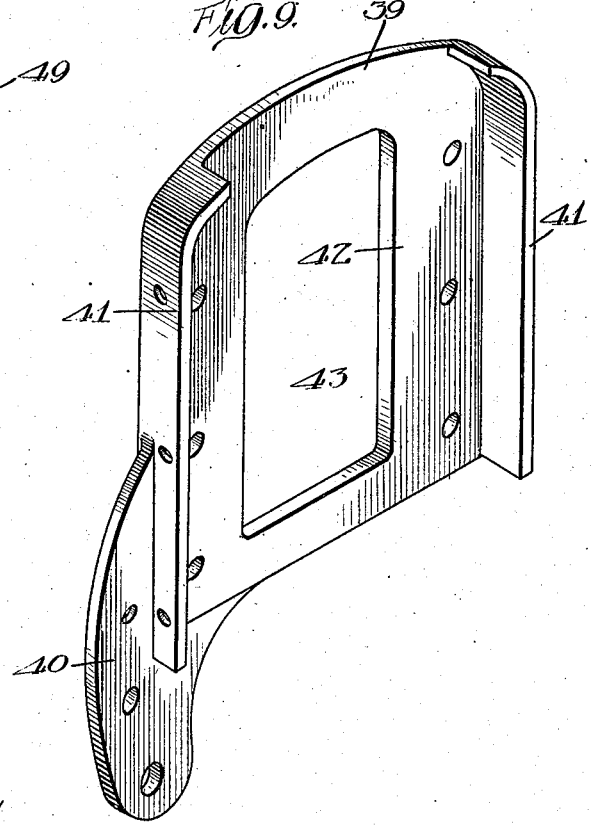
Figure 10:
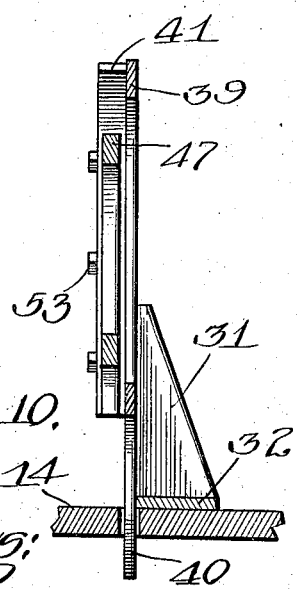
Figure 11:
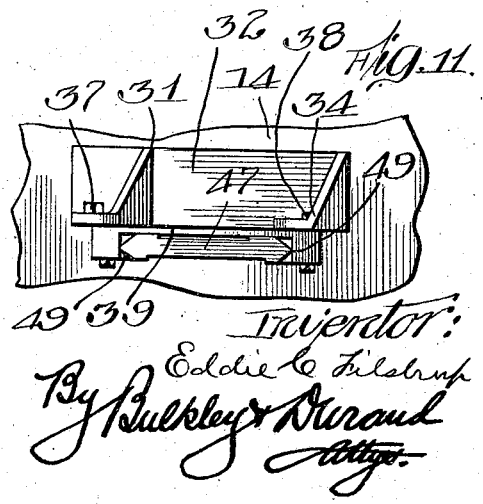

These and such other objects as may hereinafter appear are attained by my device, embodiments of which are illustrated in the accompanying drawings, in which Figure 1 is a front elevation of a saw sharpening machine, showing a portion of a saw in place. Fig. 2 is a vertical section on line 2—2 of Fig. 1, looking in the direction indicated by the arrows. Fig. 3 is a front view of the back plate support. Fig. 4 is a sectional view on line 4—4 of Fig. 1, looking in the direction indicated by the arrows. Fig. 5 is a sectional view on line 5—5 of Fig. 1, looking in the direction indicated by the arrows. Fig. 6 is a sectional view on line 6—6 of Fig. 1, looking in the direction indicated by the arrows. Fig. 7 is a perspective view of my improved gib. Fig. 8 is a perspective view of my improved gate. Fig. 9 is a perspective view of my improved gate frame or back plate 2. Fig. 10 is a sectional view on line 10—10 in Fig. 2, looking in the direction indicated by the arrows. Fig. 11 is a plan view of a portion of Fig. 1. Fig. 12 is a perspective of the improved bolt with bearing plate.

Like numerals of reference indicate like parts in the several figures of the drawing.

14 represents the frame of the machine; 15, supports therefor; 16, cross-braces; 17 represents a fragment of a saw held in place against the frame by means of a vertical guide-plate and a spring hasp 18 yieldingly bearing against the plate. The saw rests upon the support or guide 19. A reciprocating feed arm 20 carrying the feed finger 21 is pivoted to the frame at 22. This feed finger terminates in a vertically adjustable feed pin 23, adapted to bear against different portions of the tooth, or against the teeth of saws of various sizes being operated upon.

An adjustable frame 39 is employed for the grinding-wheel gate 24, and this gate may be adjusted by any suitable means, as, for instance, a threaded rod 25 mounted on the frame 39 in any suitable manner and working through a nut pivotally connected to the gate frame by a pivot bolt 50, or any other suitable manner, the operation and function of said rod being fully disclosed in patent to Schofield, No. 755,319, March 22, 1904. The gate carries the grinding wheel 26. The feed arm 20 is connected to the rock-arm 27 by a rod 28, and a spring 29 connects the rock arm to the feed-arm and normally holds the rock arm against the cam 30.

Referring now to Figs. 1, 2 and 3: 31 represents the back plate support which is rigidly secured to the frame 14, and comprises a base 32 and uprights 33 and 34. These uprights are provided with grooved slots 35—36. Bolts 37—38 pass through the slots and into the gate frame or back-plate 39. The gate frame 39 comprises the downwardly depending portion 40, which is secured to the upright 33, side flanges 41—41, and a main frame 42, having in its center an opening 43. Gibs 44 having elongated bolt holes 45 and a V-shaped groove 46 on their inner sides fit within the sides of the gate-frame or back-plate, as shown in Fig. 5. The gate 24, to which are secured the pulley 48 and the grinding wheel 26, slides within the grooves 46 in the gibs, the sides of the gate tapering to a point, as shown at 49, and snugly fitting the grooves in the gib. By means of bolts 51 passing through the gibs and plate, the gibs are adjustably secured to the plate, making it possible to preserve at all times a snug fit between the gate and gibs. Set-screws 52 pass through the sides of the frame and engage the gibs, making it possible to obtain a more perfect adjustment of the gibs. The grinding wheel 26 which operates on the saw tooth is removed a short distance from the side of the gate-frame, and the slots 35 and 36 in the back-plate support follow the lines of the circumference of a circle having the extreme edge of the grinding wheel at 53 as its center, the back plate gate and means for varying the position of the grinding wheel may be termed a movable head.

In Fig. 3 I have shown the line of the slots 35 and 36 extended in the grooves 54 and 55 and a bolt 56 provided with a head or bearing plate 57 adapted to fit within the groove 54. A similar bolt is adapted to fit within the groove 55.

In Fig. 5 I have shown bosses or guides 58 taking the place of the bearing plates adapted to fit within the grooves 55—54 and accomplishing the same results. By thus employing guiding heads 57 (or guiding bosses 58) and so arranging them that they work in the slots 35 and 36, the grinding-wheel frame is firmly supported and guided in its various positions and movements and by providing the slots with the groove-continuations 54 and 55 a wider range of adjustment is secured than could be secured by slots alone unless the necessary rigidity of the slotted supports were sacrificed. By means of this arrangement of the slots, when it becomes necessary to change the position of the grinding-wheel in order to operate at a different angle on the tooth, it is only necessary to loosen the nuts on the bolts 37 and 38, and then move the gate-frame and gate carrying the grinding wheel until the wheel is in the desired position. The nuts are again tightened and the grinding operation continued. It will thus be seen that the shifting of the grinding wheel, which is necessary for the efficient working of the machine, becomes a matter of extreme simplicity and at the same time is performed with the greatest accuracy.

It is evident that the operation of the wheel upon the tooth is one of considerable delicacy and requiring accuracy in the position of the grinding wheel and the feed of the saw under operation, and a variation of this position of even one-sixteenth or one-thirty-second of an inch will cause disastrous results in the work accomplished. In the old method of shifting the grinding wheel, a point—say, for instance, the bolt 52—was used as the center about which the shifting took place; inasmuch as the grinding wheel was removed at some little distance from the side of the gate, and also in front of it, the operation of adjusting the wheel to any desired position became a matter of considerable work, it being necessary to change it quite a number of times before the desired angle or position was attained. By the use of my improved device, however, this important feature in the work of the machine is reduced to a very small operation, the use of the vertically adjustable feed pin in conjunction with the movable head, making it possible to operate on various sizes of saws by merely changing the positions of the wheel and finger to meet the changed conditions, the grinding wheel and feed finger and pin coöperating to attain a result never before attained in machines of this character.

Another feature that is of considerable importance in the construction of the machine is the use of the grooved gibs 44 in connection with the angularly-shaped sides 49 of the gate. By the use of this feature of my device, the gate is always securely locked in position without the use of bolts or nuts, the adjustable feature of the gibs making it possible to securely bind the gate in place. When it is desired to remove the gate, or shift the position thereof, it is simply necessary to loosen the bolts holding the gib in place, thus permitting the gate to slide freely in the grooves 46.

The utilization of the contacting point of the grinding wheel with the saw as the center about which the gate is shifted is a very important feature of my invention, as it is often desirable to vary the angle of the tooth in grinding and thus cut away more of the body of tooth and at the same time not change the initial point of operation. By the use of the shifting gate and adjustable feed pin, the operator is thus enabled to have the initial operation on successive teeth at points that absolutely correspond, and thus obtain results long sought for in the art without success.

I claim:

In a saw sharpening machine, a frame, a back frame support provided with a series of concentric slots and a series of grooves of a like curvature extending from the ends of said slots, a grinding wheel, supporting means for said grinding wheel, clamping bolts carried by said supporting means and extending through and working in said slots, and a series of guides secured to said supporting means and adapted to travel in said slots and grooves, said grooves and slots and guides being so positioned that the angular position of the grinding wheel may be shifted without changing its point of contact with the saw tooth being operated upon.

Signed by me at Chicago, Illinois, this 22nd day of December, 1906.

EDDIE C. FILSTRUP.

Witnesses:
S. LEWIS,
ALBERT JOHN SAUSER.